United States Patent
Gunnmarker et al.

(10) Patent No.: US 7,451,351 B2
(45) Date of Patent: Nov. 11, 2008

(54) FAULT DETECTION IN AN INDUSTRIAL CONTROLLER DURING SAFETY CONTROL

(75) Inventors: Mats Gunnmarker, Oslo (NO); Kai Hansen, Oslo (NO); Audun Opem, Ski (NO)

(73) Assignee: ABB AS, Billingstad (NO)

( * ) Notice: Subject to any disclaimer, the term of this patent is extended or adjusted under 35 U.S.C. 154(b) by 346 days.

(21) Appl. No.: 10/531,210

(22) PCT Filed: Oct. 13, 2003

(86) PCT No.: PCT/IB03/04493

§ 371 (c)(1),
(2), (4) Date: Feb. 6, 2006

(87) PCT Pub. No.: WO2004/036429

PCT Pub. Date: Apr. 29, 2004

(65) Prior Publication Data

US 2006/0248509 A1    Nov. 2, 2006

(30) Foreign Application Priority Data

Oct. 15, 2002 (SE) .................................. 0203054

(51) Int. Cl.
*G06F 11/00* (2006.01)
(52) U.S. Cl. ........................................................ 714/38
(58) Field of Classification Search ..................... 714/38
See application file for complete search history.

(56) References Cited

U.S. PATENT DOCUMENTS

| | | | | |
|---|---|---|---|---|
| 4,819,233 A | * | 4/1989 | Delucia et al. | 717/129 |
| 5,671,351 A | | 9/1997 | Wild et al. | |
| 5,754,860 A | * | 5/1998 | McKeeman et al. | 717/124 |
| 5,761,510 A | * | 6/1998 | Smith et al. | 717/124 |
| 5,845,064 A | * | 12/1998 | Huggins | 714/33 |
| 6,002,869 A | * | 12/1999 | Hinckley | 717/124 |
| 6,071,316 A | * | 6/2000 | Goossen et al. | 717/126 |

(Continued)

FOREIGN PATENT DOCUMENTS

EP    1063591 A2    12/2000

(Continued)

*Primary Examiner*—Bryce P Bonzo
(74) *Attorney, Agent, or Firm*—Venable LLP; Eric J. Franklin

(57) ABSTRACT

A method to detect a fault in a CPU of an industrial controller during on-line safety control of real world objects. An application program is complied into assembler instructions. A test application is complied into assembler instructions where the assembler instructions is a subset of the total number of assembler instructions available for the CPU. The application program is downloaded and the test application to a central unit of an industrial controller. The test application is repeatedly executed in the industrial controller. A result from the test application is repeatedly compared with the pre-defined result in the test module. A fault detected in the CPU as the result from the test application does not equal the pre-defined result stored in the test module and the unexpected result of the test application is due to the execution of an assembler instruction of the test application. The execution of the application program is aborted wherein the application program is prohibited from executing the assembler instruction which otherwise would cause the application program to fail.

10 Claims, 2 Drawing Sheets

U.S. PATENT DOCUMENTS

| | | |
|---|---|---|
| 6,081,908 A | 6/2000 | Yamada |
| 6,321,376 B1 * | 11/2001 | Willis et al. .................. 717/124 |
| 6,591,413 B1 * | 7/2003 | Humphrey et al. .......... 717/125 |
| 6,986,110 B1 * | 1/2006 | Thompson et al. ............. 716/4 |
| 6,993,748 B2 * | 1/2006 | Schaefer ..................... 717/124 |
| 7,047,522 B1 * | 5/2006 | Dixon et al. ................ 717/131 |
| 7,222,265 B1 * | 5/2007 | LeSuer et al. ................. 714/38 |
| 7,231,635 B2 * | 6/2007 | Schwabe ..................... 717/126 |
| 2008/0005547 A1 * | 1/2008 | Papakipos et al. ........... 712/244 |

FOREIGN PATENT DOCUMENTS

| | | |
|---|---|---|
| GB | 2277814 A | 11/1994 |
| WO | 0036492 A2 | 6/2000 |

* cited by examiner

FAULT DETECTION IN AN INDUSTRIAL CONTROLLER DURING SAFETY CONTROL

TECHNICAL FIELD

The present invention relates to diagnostics of a CPU executing instructions for safety control in the context of an industrial control system.

BACKGROUND ART

Industrial control systems are for instance applied in manufacturing and process industries, such as chemical plants, oil production plants, refineries, pulp and paper mills, steel mills and automated factories. Industrial control systems are also widely used within the power industry. A standard defining language constructs for an industrial control system is IEC 61131-3. Such an industrial control system may comprise or may be combined with certain devices adding safety features. An example of such a device is a safety controller. Example of processes which requires additional safety features other than what a standard industrial control system provides are processes at off-shore production platforms, certain process sections at nuclear power plants and hazardous areas at chemical plants. Safety features may be used in conjunction with safety shutdown, fire and/or alarm systems as well as for fire-and-gas detection. The use of complex computer systems relating to industrial control systems with added safety features raises challenges in the increased need to detect faults in an industrial controller.

One example of a device in an industrial control system which has increased capability of fault detection is described in GB2277814, which concerns a fault tolerant PLC (Programmable Logic Controller) including a CPU. A pair of first I/O modules are connected between a positive power bus and a load. A pair of second I/O modules are connected between the negative power bus and the load. GB 2 277 814 further describes that power to the load is not disconnected upon failure of one of the I/O modules on either side of the load. A disadvantage of the method is that it does not take in account possible failures in the CPU.

In general computing it is known to let a program execute a test including CPU instructions and compare the result with a predetermined correct result. This can be done once at start-up time or cyclically in runtime. U.S. Pat. No. 6,081,908 describes a method to store and verify a test code. The method concerns test of a one chip micro-computer having at least a CPU and a ROM installed in a single package.

Other known general computing methods to detect faults in a CPU utilizes a watchdog timer. A timer counter receives a clocked input pulse of predetermined frequency and the count of the timer counter is incremented each time a pulse of the clocked input is applied. In the event that the count reaches a pre-set maximum count, the timer counter generates an output pulse. The CPU is programmed with a self-test module which checks whether the computer processor is performing correctly. Periodically, a signal derived from the self-test module is supplied by the CPU to the reset input to reset the counter. If a fault occurs in the CPU the reset will not occur and the counter will reach its maximum value, which indicates a fault. A disadvantage with such a method is that when a fault occurs in the CPU the reset signal may be stuck and the counter might never reach its maximum value despite a fault in the CPU.

EP 1 063 591 describes a method for detecting a fault condition in a computer processor operating a main program. The method comprises the step of sequentially performing a plurality of functions on an initial input value. A disadvantage with this fault detection is that it does not describe how to detect faults in a CPU that otherwise would occur during execution of an application program comprising safety related instructions.

In prior art a CPU intended for safety control may be tested by executing an application program off-line, that is before the safety controller is used for on-line safety control of real world objects. A disadvantage with such an approach is that once the CPU is used for on-line safety control it is during execution of the application program that a possible CPU fault occurs, hence such an approach will not detect CPU faults during on-line safety control. Another disadvantage is that such an off-line test is not automatically performed, hence the off-line test is performed only if a person initiate an off-line test. A more thorough test known in prior art is to run a test program off-line which comprise all main instructions of the CPU. A disadvantage with such a test method is that it is not suitable for on-line test since it tends to become too CPU consuming.

SUMMARY OF THE INVENTION

An object of the invention is to provide a method to detect a fault in a CPU of an industrial controller, which is intended for safety control of real world objects. The invention enables the detection of a fault in the CPU during on-line execution of an application program by repeatedly executing a test application. The test application comprises a subset of the total number of the assembler instructions available for the CPU.

A method based on the invention comprises a step, where the high-level language constructs defined in an application program are additionally defined in a test application. The application program is defined in a high level language intended for safety control and is later compiled into assembler instructions. The method comprises a step where the test application is compiled into assembler instructions where the assembler instructions are a subset of the total number of instructions available for the CPU. The application program as well as the test application is downloaded to the industrial controller. In the industrial controller the test application is repeatedly executed. Further, a result from the test application is compared with a pre-defined result in a test module. The method comprise a further step where faults in the CPU are detected during on-line safety control of real world objects where a fault in the CPU is detected by executing the test application.

A method based on the invention enables the detection of a fault in the CPU which is made evident at the execution of a certain assembler instruction comprised in the test application. Examples of faults in the CPU are failures in the registers of the CPU and failures in memory such as cache memory. The invention enables the detection of a CPU fault before the assembler instruction is executed by a safety critical application program. An important aspect of the invention is that the detection of a CPU fault at the execution of a certain assembler instruction is made during on-line safety control of real world objects. The steps of the method based on the invention are not necessarily performed in the order they are mentioned.

In the context of the invention the term industrial controller should not limit the scope of the invention, and an example of an alternative term is a PLC (Programmable Logical Controller).

Yet a further object of the invention is to provide a computer program product for use in an industrial control system, containing software code means loadable into the central unit of an industrial controller intended for safety control of real world objects. The said computer program product comprises means to make the industrial controller execute relevant steps of the previously described method.

Yet another object of the invention is to provide an industrial control system, comprising an industrial controller with a central unit equipped with a CPU intended for safety control of real world objects, and an I/O system where the CPU is subject to fault detection according to above described method.

An important advantage of the invention at hand is that it provides enhanced safety integrity level of safety critical applications.

A further advantage of the invention is that it discloses an efficient way to test CPU instructions and detect faults, related to safety control of real world objects where the safety application is defined in a high-level control language such as IEC 61131-3.

A further advantageous feature of the invention is that it provides for detection of a fault in a CPU which fault is made evident at execution of a certain CPU instruction.

BRIEF DESCRIPTION OF THE DRAWINGS

The present invention will be described in more detail in connection with the enclosed schematic drawings.

DETAILED DESCRIPTION OF THE INVENTION

Figure 1:
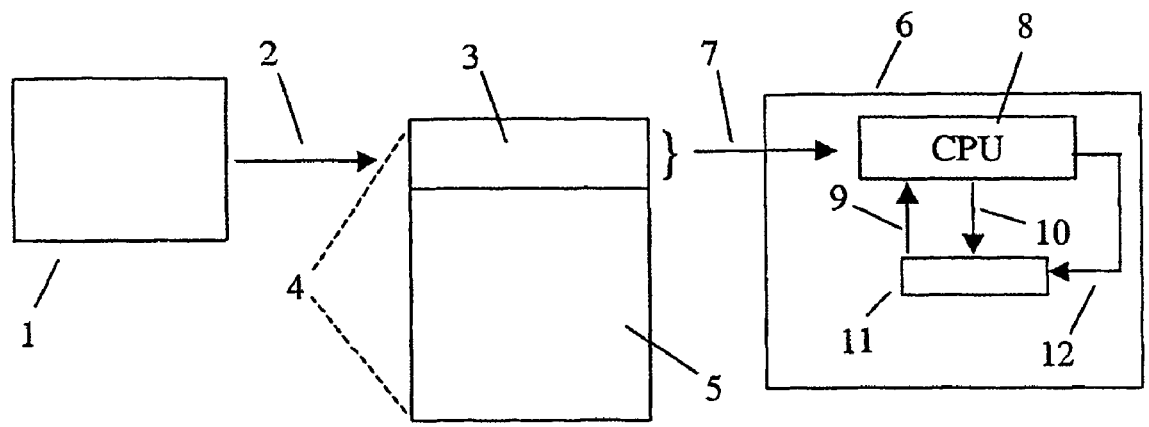
FIG. 1 shows a simplified diagram of the test application (in a high-level language such as IEC 61131-3), the test application is compiled into CPU instructions in assembler.

FIG. 1 shows a central unit 6 of an industrial controller 6 comprising a CPU 8, 22. A CPU 8, 22 intended for safety control of real world objects 24 is typically a CPU intended for general industrial use. Such a CPU is comprised in a central unit 6 of an industrial controller. An example of such a CPU is the MPC86x CPU from Motorola Inc. Such a CPU has an instruction set of approximately 230 main instructions. A typical application program relating to safety control of real world objects utilize a ⅓ of the main instructions. The inventors have found that an efficient on-line fault detection of the CPU is to execute a test application containing only those assembler instructions which previously were derived from a test application defined in a high-level control language such as IEC 61131.

FIG. 1 shows an overview of the invention. A test application 1 comprises all relevant high-level language constructs for safety control of real world objects 24. In a preferred embodiment the high-level test application is defined according to IEC 61131-3. The language version may be any of those as defined in IEC 61131-3, such as structured text, ladder or function block diagram. The test application 1 is compiled 2 to a test application in assembler code 3. The test application, which has been compiled into assembler code 3 comprises instructions which are a subset of the total available main instructions 4 for the CPU. Hence, the majority of the main CPU instructions 5 are not used in the test application 3, which results in that the test application consume less resources during execution compared to a test including all available CPU instructions. In an embodiment of the invention test application comprise the assembler instructions corresponding of an application program for on-line safety control. Further FIG. 1 shows that the test application in assembler code is down-loaded 7 to at least one central unit 6 of the industrial controller. A central unit 6 may comprise a plurality of modules and/or boards, such as circuit boards. A typical central unit 6 comprises a back-plane and communication means for communicating with real world objects. For redundancy reasons the central unit may comprise a plurality of certain type of circuit boards and/or modules. An example of such redundancy is redundant main CPU boards. The test application 3 is executed by the CPU 8, 22 intended for safety control of real world objects 24. A validation module 11 is used for a test validation function of the result 10 of an execution of the test application. The module 11 receives output values 10 from the CPU executing the test application 3 and compare the results with predefined results. The module 11 may also send input values 9 to the test application executing in the CPU. A synchronization 12 between the CPU 8 and the module 11 may be used in order to flag for the test validation function when an output value is available. In one embodiment the validation module 11 comprise a Dual Port Memory which is used for the updates of output from the test application 3 and allows the validation function of the module 11 to access the output values. The output values may contain a sequence number which is used by the validation function to establish which test parameters the test application has answered on.

It should be appreciated that the invention increase the reliability of the on-line safety control considerably compared with what is revealed in prior art. That is due to that the test application is executed even during on-line safety control and that it in its compiled form comprise all the individual assembler instructions of the application program. During a stable process and normal control of real world objects certain assembler instructions are not executed. The detection of an abnormal or dangerous process situation such as the detection of explosive or toxic gas may take place weeks or months after the initial down-load of the application program. After the detection of an abnormal or dangerous process situation the application program for safety control of real world objects may execute routines and certain assembler instructions which are not executed during a stable process and normal control of real world objects. The invention insures that also those certain assembler instructions are subject to execution but by the test application in order to detect errors in the CPU.

Figure 2:
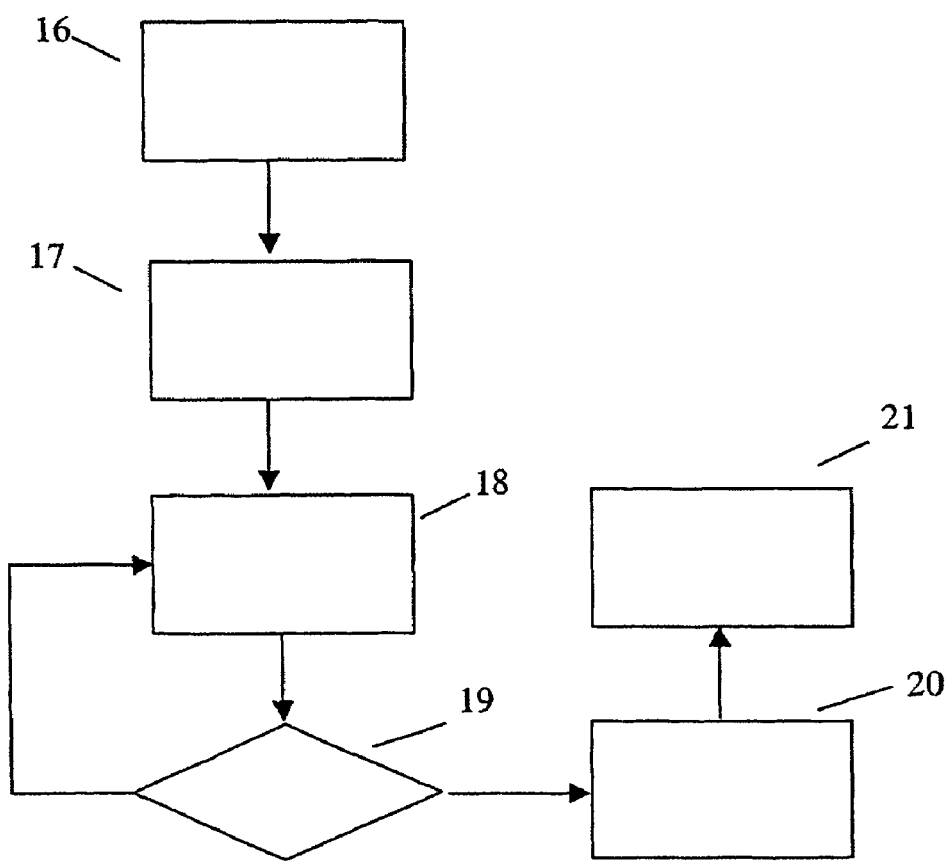
FIG. 2 shows an overview of a method based on the invention.

FIG. 2 shows an overview of a method based on the invention. It is a method to detect a fault in a CPU of an industrial controller during on-line safety control of real world objects. FIG. 2 shows that the method comprises the step of compiling 16 an application program defined a high level language intended for safety control into assembler code. The method comprises the step of compiling 17 the test application 1 into assembler instructions 3, where the test application was previously defined in the same high level language as the application program. As an alternative term assembler code may be used instead of assembler instructions. The assembler instructions of the compiled test application is a subset of the total number of assembler instructions available for the CPU defining a test application where the test application covers at least all language constructs used in the application program.

FIG. 2 further shows a downloading step 17 where the application program, the test application and a pre-defined result of the test application is downloaded to the central unit 6 of an industrial controller. In a preferred embodiment the down-load 7 of the test application and the application program is made in sequence as a consequence of an update or change in the application program. It is preferred that the software routines managing the down-load of the application program automatically down-loads the test application. However, it is also possible to execute the down-loading step in such way that the test application as well as the predefined result is down-loaded at an other time than the application program. The method comprise the further step of executing 18 repeatedly the assembler test application in the industrial controller. In one embodiment of the invention the test application is executed cyclically. It is preferred that the cycle time is determined from a given process safety time value during normal on-line safety operation. The execution of the test application 3 is made during on-line control of real-world objects 24, which implies that the application program is also executing in the CPU. In one embodiment it is the complete test application which is executed before the execution cycle is repeated. In a preferred embodiment the test application is divided into a plurality of functional parts where each of the functional parts are executed before the execution cycle is repeated. In a preferred embodiment each of the functional parts have corresponding pre-defined result.

FIG. 2 also shows the step of comparing 19 the result 10 of the test application with the predefined result or one of the predefined results. The comparing step is in a preferred embodiment mainly performed by a validation module 11. FIG. 2 shows the further step of detecting 20 a fault in the CPU 8, 22. In one embodiment the detection is made such that an operator is notified, for instance, by means of an alarm system. The detecting may comprise that the assembler instruction and/or test function is stored in a log or similar means for analysis purposes. A further step of aborting 21 the execution of the application program prohibits the execution of the assembler instruction which otherwise would cause the application program to fail.

The previous mentioned steps are mentioned in an order, which is an example of the order the steps can be performed in.

Figure 3:
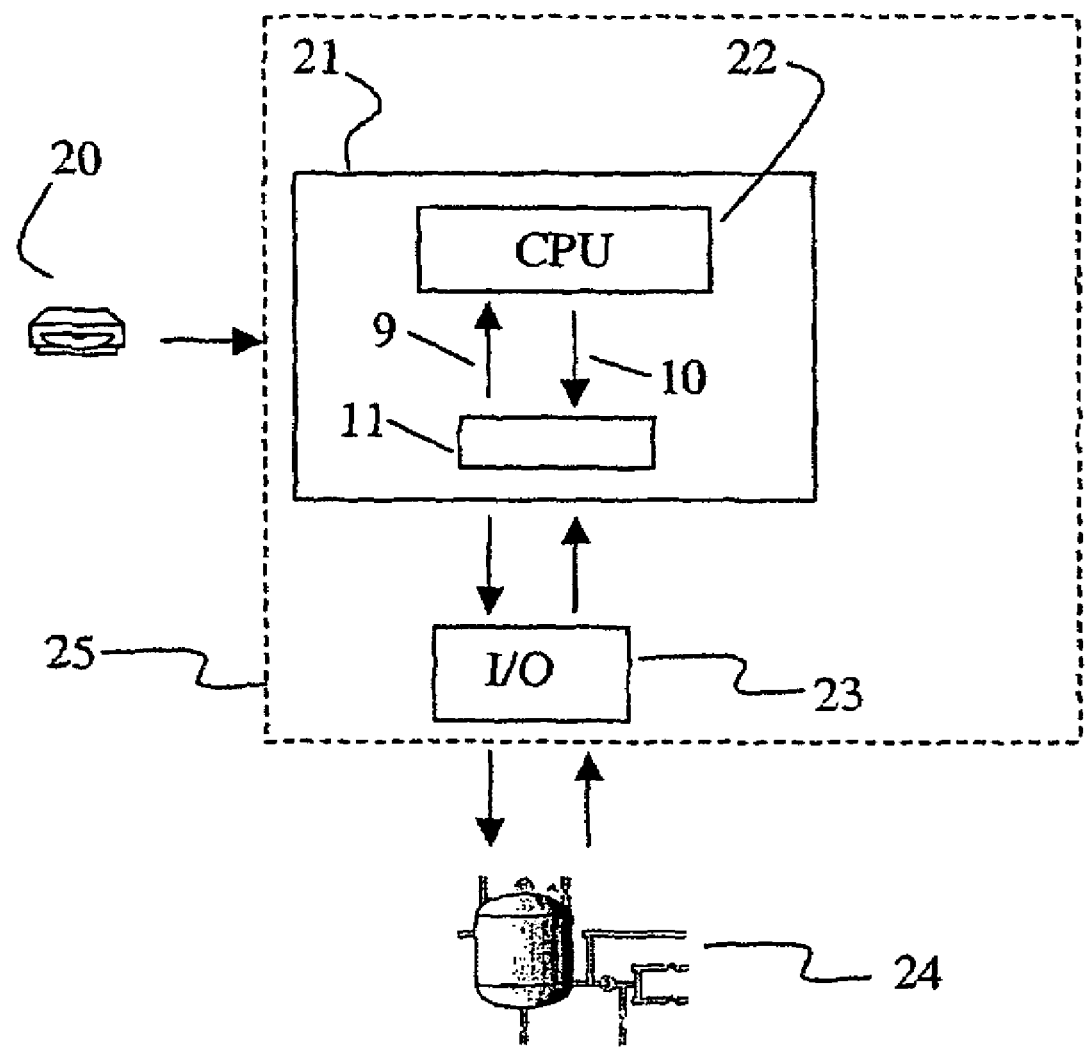
FIG. 3 is a schematic overview of a system based on the invention.

FIG. 3 shows another embodiment of the invention which is as a system, such as an industrial control system 25, comprising an industrial controller with a central unit 21 equipped with a CPU 22, intended for safety control of real world objects 24, an I/O system 23 where the CPU 8, 22 is subject to fault detection according to the above described method.

Examples of real world objects subject to safety control are actuators, valves, motors, drive systems and fans. Further examples are more complex real world objects such as gas/smoke/fire detection systems, drilling equipment, pipes and pipelines, distillation columns, compressors, conveyor systems, boilers and turbines. An example of a more complex real world object 24 is shown in FIG. 3.

The invention claimed is:

1. A method to detect a fault in a CPU of an industrial controller during on-line safety control of real world objects the method comprising:
compiling an application program into assembler instructions, which application program was previously defined in a high level language intended for safety control,
compiling a test application into assembler instructions where the assembler instructions is a subset of the total number of assembler instructions available for the CPU, which test application was previously defined in said high level language intended for safety control and the test application covers at least all language constructs used in the application program,
downloading the application program and the test application to a central unit of an industrial controller,
executing repeatedly the test application in the industrial controller,
comparing repeatedly by means of a test module a result from the test application with the pre-defined result in the test module,
detecting a fault in the CPU as the result from the test application does not equal the pre-defined result stored in the test module and the unexpected result of the test application is due to the execution of an assembler instruction of the test application,
aborting the execution of the application program wherein the application program is prohibited from executing the assembler instruction which otherwise would cause the application program to fail.

2. The method according to claim 1, wherein the assembler version of the test application comprise assembler code derived from all language constructs in the high-level language available for safety control of real world objects.

3. The method according to claim 1, wherein the high level language intended for safety control is based on IEC 61131-3.

4. The method according to claim 3, wherein defining a test application analyzing the application in order to determine subset and software libraries used in the said application code.

5. The method according to claim 4, wherein a test application is defined automatically without any additional command from an application programmer.

6. The method according to claim 5, wherein executing the test application repeatedly is performed by a cyclic execution of the test application where the cycle time is determined from a given process safety time value.

7. The method according to claim 6, wherein the test application before an execution receives a set of input values and the input values are generated by means of the test module.

8. The method according to claim 7, wherein down-loading the application program and test application additionally comprise down-loading a predefined result.

9. A computer program product, for use in an industrial control system, the computer program product comprising:
software code means loadable into the central unit of an industrial controller intended for safety control of real world objects, said computer program product comprising means to make the industrial controller carry out a method comprising:
repeatedly executing a test application in an industrial controller, wherein the repeated execution comprises execution of assembler instruction of the test program,
repeatedly comparing with a test module a result from the test application with a pre-defined result in the test module,
detecting a fault in a CPU if the result from the test application does not equal the pre-defined result stored in the test module and an unexpected result of the test application is due to the execution of the assembler instruction of the test application, and
aborting execution of an application program wherein the application program is prohibited from executing the assembler instruction which otherwise would cause the application program to fail.

10. An industrial control system, comprising an industrial controller with a central unit equipped with a CPU intended for safety control of real world objects, an I/O system wherein the CPU is subject to fault detection according to a method comprising
compiling an application program into assembler instructions, which application program was previously defined in a high level language intended for safety control, compiling a test application into assembler instructions where the assembler instructions is a subset of the total number of assembler instructions available for the CPU, which test application was previously defined in said high level language intended for safety control and the test application covers at least all language constructs used in the application program, downloading the application program and the test application to a central unit of an industrial controller, executing repeatedly the test application in the industrial controller, comparing repeatedly by means of a test module a result from the test application with the pre-defined result in the test module, detecting a fault in the CPU as the result from the test application does not equal the pre-defined result stored in the test module and the unexpected result of the test application is due to the execution of an assembler instruction of the test application, and aborting the execution of the application program wherein the application program is prohibited from executing the assembler instruction which otherwise would cause the application program to fail.

* * * * *